US010397859B2

(12) United States Patent
Liu

(10) Patent No.: US 10,397,859 B2
(45) Date of Patent: Aug. 27, 2019

(54) WIRELESS NETWORK ACCESS

(71) Applicant: Beijing Zhigu Rui Tuo Tech Co., Ltd, Beijing (CN)

(72) Inventor: Jia Liu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 48 days.

(21) Appl. No.: 15/100,292

(22) PCT Filed: Nov. 6, 2014

(86) PCT No.: PCT/CN2014/090435
§ 371 (c)(1),
(2) Date: May 27, 2016

(87) PCT Pub. No.: WO2015/078276
PCT Pub. Date: Jun. 4, 2015

(65) Prior Publication Data

US 2017/0006538 A1 Jan. 5, 2017

(30) Foreign Application Priority Data

Nov. 30, 2013 (CN) ........................ 2013 1 06286633

(51) Int. Cl.
*H04W 48/20* (2009.01)
*H04W 4/80* (2018.01)
(Continued)

(52) U.S. Cl.
CPC ............. *H04W 48/20* (2013.01); *H04W 4/80* (2018.02); *H04W 52/0216* (2013.01);
(Continued)

(58) Field of Classification Search
CPC ............... H04W 48/20; H04W 48/008; H04W 52/0216; H04W 52/0219; H04W 52/0229;
(Continued)

(56) References Cited

U.S. PATENT DOCUMENTS 7,336,960 B2 2/2008 Zavalkovsky et al.
8,588,751 B2 11/2013 Rinta-Aho et al.
(Continued)

FOREIGN PATENT DOCUMENTS

CN 101310550 A 11/2008
CN 101730280 A 6/2010
(Continued)

OTHER PUBLICATIONS

International Search Report for PCT Patent Application No. PCT/CN2014/090435 dated Feb. 6, 2015, 2 pages.

*Primary Examiner* — Jenee Holland
(74) *Attorney, Agent, or Firm* — Amin, Turocy & Watson, LLP

(57) ABSTRACT

Wireless network access is described. Prompt information can be received, where the prompt information is used to prompt existence of access point (AP) information that can be acquired. The AP information can be acquired by using a low-energy wireless communication protocol. An AP can be selected to access a wireless network according to the AP information. A client device can be prompted, by sending prompt information to the client device before the client device accesses an AP, that the client device can acquire AP information, so that a user can select the most appropriate AP according to the AP information. Enabling receipt of the AP information after the prompt information is received can reduce power consumption of the client device, and use of the low-energy wireless communication protocol can further reduce power consumption costs of the client device.

39 Claims, 6 Drawing Sheets

(51) Int. Cl.
*H04W 52/02* (2009.01)
*H04W 88/08* (2009.01)
*H04W 84/12* (2009.01)

(52) U.S. Cl.
CPC ... *H04W 52/0219* (2013.01); *H04W 52/0229* (2013.01); *H04W 84/12* (2013.01); *H04W 88/08* (2013.01); *Y02D 70/00* (2018.01); *Y02D 70/142* (2018.01); *Y02D 70/144* (2018.01); *Y02D 70/162* (2018.01); *Y02D 70/166* (2018.01)

(58) Field of Classification Search
CPC ....... H04W 84/12; H04W 88/08; H04W 4/80; Y02B 60/50; Y02D 70/00; Y02D 70/144; Y02D 70/162; Y02D 70/166
See application file for complete search history.

(56) References Cited

U.S. PATENT DOCUMENTS

2002/0059614 A1* 5/2002 Lipsanen ............... H04N 7/163 725/75
2003/0009580 A1* 1/2003 Chen ..................... H04W 72/02 709/231
2003/0064726 A1* 4/2003 Bae ........................ H04W 8/26 455/445
2003/0108059 A1* 6/2003 Yew ........................ H04L 47/15 370/443
2004/0039817 A1* 2/2004 Lee ........................ H04W 24/00 709/225
2004/0185845 A1* 9/2004 Abhishek .............. H04W 48/16 455/422.1
2005/0025174 A1* 2/2005 Fischer ................. H04W 88/10 370/445
2005/0071476 A1* 3/2005 Tejaswini ............... H04W 8/22 709/227
2005/0136845 A1* 6/2005 Masuoka .............. G01S 5/0294 455/67.14
2005/0148326 A1* 7/2005 Nogawa .............. H04L 41/0806 455/420
2005/0286466 A1* 12/2005 Tagg ................... H04L 12/2856 370/329
2006/0079232 A1* 4/2006 Omori ............... H04W 36/0088 455/436
2006/0111103 A1* 5/2006 Jeong .................... H04W 48/14 455/434
2006/0126579 A1* 6/2006 Kim .................... H04L 12/2856 370/338
2006/0252449 A1* 11/2006 Ramesh ................ H04W 52/44 455/522
2007/0066304 A1* 3/2007 Lee ....................... H04W 48/20 455/436
2007/0111731 A1 5/2007 Zaki et al.
2007/0115877 A1* 5/2007 Zhen ..................... H04W 72/10 370/329
2007/0160017 A1* 7/2007 Meier ................... H04W 36/18 370/338
2007/0185804 A1* 8/2007 Cordoba ................ G06Q 30/02 705/37
2008/0049702 A1* 2/2008 Meylan ................. H04W 48/20 370/342
2008/0068991 A1* 3/2008 Ponauswamy ........ H04W 28/24 370/230
2008/0226075 A1* 9/2008 Gast ...................... H04L 9/0841 380/270
2009/0017798 A1* 1/2009 Pop ......................... H04W 4/80 455/414.1
2009/0046654 A1* 2/2009 Hoshi ............... H04W 36/0088 370/331
2009/0086684 A1* 4/2009 Kelly .................... H04W 16/14 370/336
2009/0116448 A1* 5/2009 Nam ..................... H04W 48/16 370/331
2010/0304678 A1* 12/2010 Chandra ............... H04W 16/14 455/62
2011/0128890 A1 6/2011 Schein et al.
2011/0286437 A1* 11/2011 Austin .................... H04W 4/02 370/338
2012/0297055 A9 11/2012 Raleigh et al.
2013/0010719 A1* 1/2013 Shapira ............... H04W 72/082 370/329
2013/0034005 A1* 2/2013 Xhafa ................... H04W 76/10 370/252
2013/0201915 A1* 8/2013 Wang ...................... H04W 4/70 370/328
2013/0208701 A1* 8/2013 Cho ...................... H04W 88/04 370/331
2014/0029512 A1* 1/2014 Chu .................... H04L 63/0892 370/328

FOREIGN PATENT DOCUMENTS

CN 101867963 A 10/2010
CN 102378365 A 3/2012
CN 102638869 A 8/2012
CN 102882637 A 1/2013
CN 103118419 A 5/2013
CN 103281752 A 9/2013
CN 103379586 A 10/2013
CN 103781158 A 5/2014
GB 2468469 A 9/2010
KR 20130038754 A 4/2013
TW 200838177 A 9/2008
TW 200840254 A 10/2008
WO 2007057035 A1 5/2007
WO 2011068804 A 6/2011
WO 2013043869 A1 3/2013
WO 2013159677 A1 10/2013

* cited by examiner

WIRELESS NETWORK ACCESS

RELATED APPLICATION

The present application is a U.S. National Stage filing under 35 U.S.C. § 371 of international patent cooperation treaty (PCT) application No. PCT/CN2014/090435, filed Nov. 6, 2014, and entitled "WIRELESS NETWORK ACCESS", which claims the benefit of priority to Chinese Patent Application No. 201310628663.3, filed on Nov. 30, 2013, which applications are hereby incorporated into the present application by reference herein in their respective entireties.

TECHNICAL FIELD

The present application relates to the field of wireless communication technologies, and for example, to wireless network access.

RELATED ART

With gradual popularization of wireless communication technologies, at present, many public places (such as shopping malls, cafes, airports, conference centers, and libraries) are deployed with Wireless Local Area Networks (WLAN) (hereinafter referred to as "wireless networks"), and a user can have access to local basic network services after accessing a corresponding wireless network through an access point (AP), or achieves a faster or cheaper Internet connection, which facilitates people's work and life. However, in a scenario of the above wireless network, a user may often encounter such a problem: when there are multiple available APs, an access object generally can only be selected according to a Signal-to-Noise Ratio (SNR) or received signal strength (RSS) because current conditions of corresponding networks cannot be known. Evidently, such a selection is not optimal, because it is likely that a large number of users have accessed APs with stronger signals, which are very crowded, and after the access, allocable bandwidth is very limited, which further exacerbates conflicts and congestion, and even the user is informed of incapability of access after waiting for a long time.

Therefore, conventional systems do not adequately enable a user to select the most appropriate wireless network AP.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

An example, non-limiting objective of the present application is to provide a wireless network access method and an access apparatus, so as to enable a user to select the most appropriate wireless network AP.

To these and/or related ends, in a first aspect of one or more embodiments of the present application, a wireless network access method is provided, where the method includes steps of:

receiving prompt information, where the prompt information is used to prompt existence of AP information that can be acquired;

acquiring the AP information by using a low-energy wireless communication protocol; and selecting, according to the AP information, an AP accessing a wireless network.

In a second aspect of one or more of the embodiments of the present application, a wireless network access method is further provided, where the method includes steps of:

sending prompt information, where the prompt information is used to prompt existence of AP information that can be acquired; and sending AP information of one or more APs by using a low-energy wireless communication protocol.

In a third aspect of one or more of the embodiments of the present application, a wireless network access apparatus is further provided, where the apparatus includes:

a first communication module, configured to receive prompt information, where the prompt information is used to prompt existence of AP information that can be acquired;

a second communication module, configured to acquire the AP information by using a low-energy wireless communication protocol; and an access module, configured to select, according to the AP information, an AP accessing a wireless network.

In a fourth aspect of one or more of the embodiments of the present application, a wireless network access apparatus is further provided, where the apparatus includes:

a third communication module, configured to send prompt information, where the prompt information is used to prompt existence of AP information that can be acquired; and a fourth communication module, configured to send AP information of one or more APs by using a low-energy wireless communication protocol.

In a fifth aspect of one or more of the embodiments of the present application, a computer readable storage device is provided, comprising at least one executable instruction, which, in response to execution, causes a system comprising a processor to perform operations, comprising:

receiving prompt information, wherein the prompt information is used to prompt existence of access point (AP) information that can be acquired;

acquiring the AP information by using a low-energy wireless communication protocol; and selecting, according to the AP information, an AP accessing a wireless network.

In a sixth aspect of one or more of the embodiments of the present application, a device for accessing wireless network is provided, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

receiving prompt information, wherein the prompt information is used to prompt existence of access point (AP) information that can be acquired;

acquiring the AP information by using a low-energy wireless communication protocol; and selecting, according to the AP information, an AP accessing a wireless network.

In a seventh aspect of one or more of the embodiments of the present application, a computer readable storage device is provided, comprising at least one executable instruction, which, in response to execution, causes a system comprising a processor to perform operations, comprising:

sending prompt information, wherein the prompt information is used to prompt existence of access point (AP) information that can be acquired; and sending AP information of one or more APs by using a low-energy wireless communication protocol.

In a eighth aspect of one or more of the embodiments of the present application, a device for accessing wireless network is provided, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

sending prompt information, wherein the prompt information is used to prompt existence of access point (AP) information that can be acquired; and sending AP information of one or more APs by using a low-energy wireless communication protocol.

The method and the apparatus of one or more of the embodiments of the present application can prompt a client device, by sending prompt information to the client device before the client device accesses an AP, that it can acquire AP information, so that a user can select the most appropriate AP according to the AP information; enabling receipt of the AP information after the prompt information is received can reduce power consumption costs of the client device to some extent, and use of the low-energy wireless communication protocol further reduces the power consumption of the client device.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Specific implementations of the present application are described in detail hereinafter with reference to the accompanying drawings and embodiments. The following embodiments are intended to describe the present application, but not to limit the scope of the present application.

Figure 1:
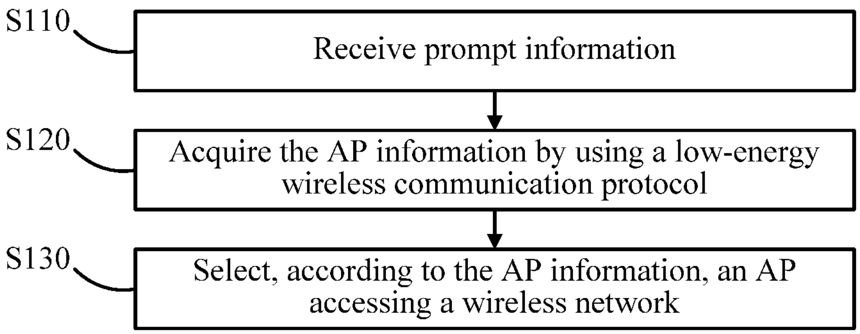
FIG. 1 is an example flowchart of a wireless network access method running on a client according to an embodiment of the present application.

Embodiments of the present application provide a wireless network access method; the method runs on a client, and may also run on a client device or another device. As shown in FIG. 1, the method includes the following steps.

S110. Receive prompt information, where the prompt information is used to prompt existence of AP information that can be acquired.

As is well known to those skilled in the art, when a client device enters a region covered by a wireless network, a Beacon message issued by an AP may be heard on a wireless network advertising channel that may be covered in the region. In the method of this embodiment, in addition to receipt of the Beacon message, if AP information that can be acquired exists, the client device further receives prompt information.

In the method of this embodiment, the prompt information is used to prompt the client device of existence of AP information that can be acquired. The AP information may include one or more of the following content: a network type, an AP ID, the number of accessed users, total link bandwidth, user effective bandwidth (that is, available effective bandwidth after user access), link transmission delay, average forward delay, delay jitter, a time stamp and so on. The prompt information may be sent by one or more APs, or may be sent by a third-party device. According to the prompt information, the client device can know a network condition of the wireless network covering the location thereof, thereby selecting, according to the network condition, the most appropriate AP to access the corresponding wireless network.

S120. Acquire the AP information by using a low-energy wireless communication protocol.

In the method of this embodiment, the AP information is received according to an agreement between the client device and one or more APs or the third-party device sending the prompt information and according to a particular low-energy wireless communication protocol; or the prompt information includes a requirement on a low-energy wireless communication protocol that should be used for receiving the AP information, the client device uses the low-energy wireless communication protocol to receive the AP information, and the low-energy wireless communication protocol may be any communication protocol whose power consumption for using a corresponding communication function is lower than power consumption for using a WiFi function, such as the classic Bluetooth protocol (Bluetooth 1.1, 1.2, 2.0, 2.1, and 3.0 versions), the Bluetooth Low Energy (BLE) protocol (Bluetooth 4.0 version), the Zigbee protocol, or the Near Field Communication (NFC) protocol. Therefore, the client device receives the AP information according to a particular low-energy wireless communication protocol, thereby reducing power consumption of sending and receiving the AP information.

S130. Select, according to the AP information, an AP to access a wireless network.

To sum up, the method of this embodiment can prompt a client device, by sending prompt information to the client device before the client device accesses an AP, that it can acquire AP information, so that a user can select the most appropriate AP according to the AP information; enabling receipt of the AP information after the prompt information is received can reduce power consumption of the client device to some extent, and use of the low-energy wireless communication protocol further reduces the power consumption costs of the client device.

In the method of this embodiment, AP information is sent and received according to a low-energy wireless communication protocol, while prompt information may be sent by using another protocol. Alternatively, the prompt information is included in a WiFi Beacon message, and is received by a client device together with the Beacon message. With reference to provisions for a frame format of a Beacon message in an 802.11 standard, the notification information may be included in a QoS Capability part or a Vendor Specific part of the Beacon message, or another suitable field.

Figure 2:
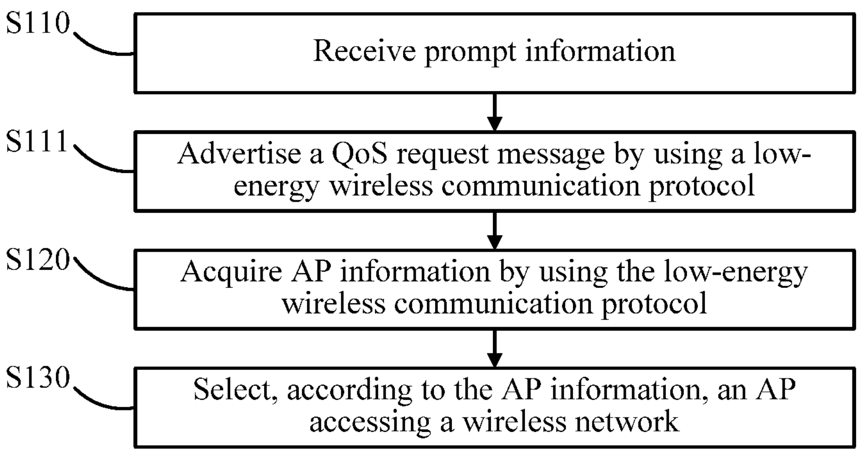
FIG. 2 is an example flowchart of a wireless network access method running on a client according to another embodiment of the present application.

In addition, in order to acquire the AP information, as shown in FIG. 2, after the prompt information is received, the method of this embodiment further includes the following step.

S111. Advertise a QoS request message by using the low-energy wireless communication protocol.

In the method of this embodiment, the prompt information is only used to prompt existence of AP information that can be received, and only indicates: an AP and/or a third-party device capable of providing the AP information exist/exists, and the AP and/or the third-party device may not provide the AP information currently. In order to acquire the AP information, the client device, after receiving the prompt information, issues a request to a possible AP and/or third-party device by determining a specific QoS requirement index of a user or an application (for example, the user hopes that an available effective bandwidth is greater than 2 Mbps, and the like) and advertising a QoS request message by using the low-energy wireless communication protocol. The QoS request message includes, but is not limited to, QoS requirements on the wireless network to be accessed, for example, it may further include conditions for responding to the QoS request message, that is, an AP satisfying the conditions may respond to the QoS request message to send corresponding AP information.

There may be more than one AP responding to the QoS message and AP information from the same AP may be sent multiple times. Therefore, after the AP information is received, in the method of this embodiment, the AP information is updated and stored after extraction of key information (for example, a network type, an AP ID, a time stamp, and other possible information) included therein, so as to select the most appropriate AP according to the stored information after a preset time (the process of receiving the AP information ends). It should be noted that, a client may have an AP information database used to store AP information, the database may maintain an AP information list, and each time the client receives AP information, the client updates the AP information list according to key information extracted from the AP information, so as to provide a basis for screening of APs.

In addition, as there may be more than one AP responding to the QoS message, in step S130, the AP to access the wireless network may be selected according to a preset rule after a preset time. For example, the preset rule may include: selecting an AP with the least number of accessed users; or may include selecting an AP with a maximum user available bandwidth, or the like. When the AP information is updated and stored, screening and sorting may be performed according to the preset rule, or screening and sorting are not performed.

Figure 3:
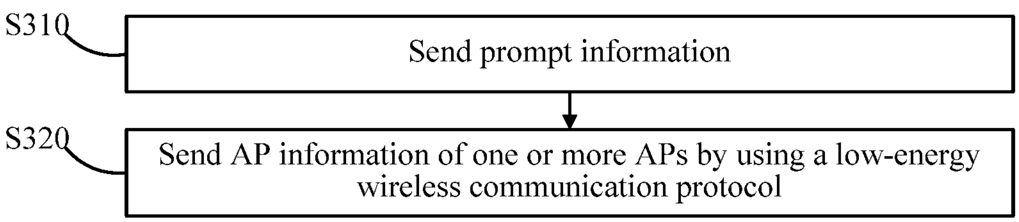
FIG. 3 is an example flowchart of a wireless network access method running on a server according to an embodiment of the present application.

Embodiments of the present application further provide another wireless network access method; the method runs on a server, for example, runs on any one or more APs, or runs on a third-party device. As shown in FIG. 3, the method includes the following steps.

S310. Send prompt information, where the prompt information is used to prompt existence of AP information that can be acquired.

As stated in the embodiment shown in FIG. 1, the prompt information may be sent by one or more APs, or may be sent by a third-party device, and used to notify a client about existence of AP information that can be acquired. The AP information may include one or more of the following content: a network type, an AP ID, the number of accessed users, total link bandwidth, user effective bandwidth (that is, available effective bandwidth after user access), link transmission delay, average forward delay, delay jitter, a time stamp and so on. According to the prompt information, the client device can know a network condition of the wireless network covering the location thereof, thereby selecting, according to the network condition, the most appropriate AP to access the corresponding wireless network.

Alternatively, the prompt information is included in a WiFi Beacon message, and is advertised together with the Beacon message and received by a client device. With reference to provisions for a frame format of a Beacon message in an 802.11 standard, the notification information may be included in a QoS Capability part or a Vendor Specific part of the Beacon message, or another suitable field.

S320. Send AP information of one or more APs by using a low-energy wireless communication protocol.

In order to reduce power consumption of sending and receiving the AP information, according to an agreement with the client device or provisions of the server, the AP information should be sent by using a particular low-energy wireless communication protocol after acquisition of the AP information, thereby saving power consumption of sending the AP information. Evidently, the server and the client use the same protocol to send and receive the AP information.

In addition, according to different execution bodies (any one or more APs or a third-party device) of the method of this embodiment, the manner of acquiring the AP information may be distributed or centralized. For example, APs acquire network condition information of their own networks, and advertise the network condition information respectively; or a particular AP acquires AP information of other APs and sends the AP information in a centralized manner; or the third-party device acquires information of APs and sends the information in a centralized manner.

Figure 4:
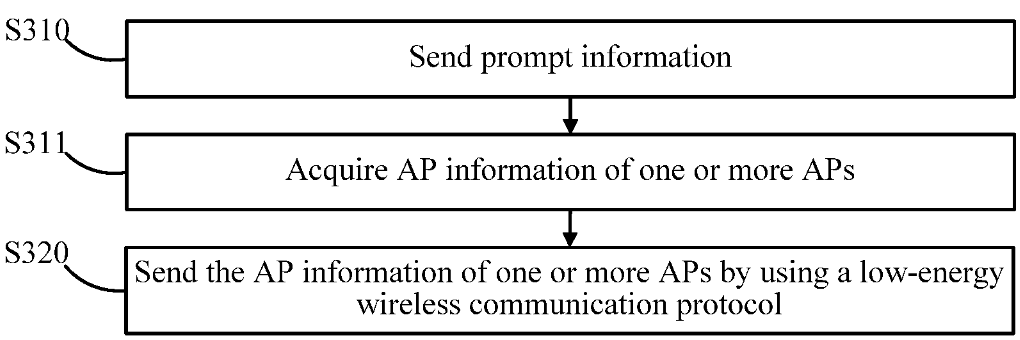
FIG. 4 is an example flowchart of a wireless network access method running on a server according to another embodiment of the present application.

Correspondingly, as shown in FIG. 4, the method of this embodiment may further include:

S311. Acquire the AP information of one or more APs.

Figure 5:
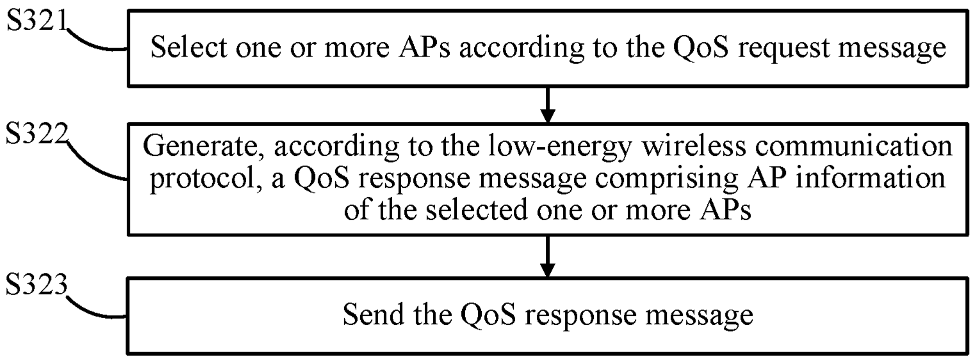
FIG. 5 is an example detailed flowchart of sending a QoS response message in a wireless network access method running on a client according to an embodiment of the present application.

In the method of this embodiment, in addition to sending prompt information and sending AP information, the server may also receive a QoS request message by using the low-energy wireless communication protocol. Moreover, as shown in FIG. 5, step S320 further includes the following steps.

S321. Select one or more APs according to the QoS request message.

The QoS request message includes QoS requirements of a user intending to access the wireless network, and in step S321, one or more APs satisfying the requirements are selected to wait for sending.

S322. Generate, according to the low-energy wireless communication protocol, a QoS response message including AP information of the one or more APs selected in step S321.

A format of generating the QoS response message according to the low-energy wireless communication protocol is, for example, as follows: a format of a advertising data packet of the AP information from an AP may be <a network type, an AP ID, one or more kinds of AP information, a time stamp>, but it is not limited thereto. It should be noted that, when the length of the AP information exceeds a maximum length limit of the QoS response message to be issued, the AP information may be divided into a plurality of data packets to send, but each data packet should include a network type, an AP ID and a time stamp to facilitate judgment on the range of the AP information.

In addition, all APs satisfying the QoS requirements may be selected, and in a case that the QoS request message includes conditions of responding to the QoS response message, APs satisfying the conditions should be selected.

S323. Send the QoS response message.

Those skilled in the art can understand that, in the methods of embodiments of the present application, sequence numbers of the steps do not mean an order of execution, the order of execution of the steps should be determined according to their functions and internal logic, but should not pose any limitation to implementation of the specific embodiments of the present application.

Figure 6:
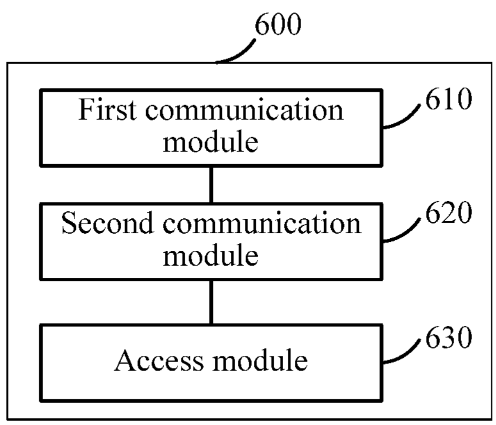
FIG. 6 is an example structural block diagram of a wireless network access apparatus of a client according to an embodiment of the present application.

Embodiments of the present application further provide a wireless network access apparatus of a client; the apparatus may be a part of a client device or an apparatus independent of the client device. As shown in FIG. 6, the apparatus 600 in this embodiment includes the following modules.

A first communication module 610 is configured to receive prompt information, where the prompt information is used to prompt existence of AP information that can be acquired.

As is well known to those skilled in the art, when a client device enters a region covered by a wireless network, a Beacon message issued by an AP may be heard on a wireless network advertising channel that may be covered in the region. In the apparatus of this embodiment, in addition to receipt of the Beacon message, if AP information that can be acquired exists, the client device may further receive prompt information through the first communication module 610.

In the apparatus of this embodiment, the prompt information is used to prompt the client device of existence of AP information that can be acquired. The AP information may include one or more of the following content: a network type, an AP ID, the number of accessed users, total link bandwidth, user effective bandwidth (that is, available effective bandwidth after user access), link transmission delay, average forward delay, delay jitter, a time stamp and so on. The prompt information may be sent by one or more APs, or may be sent by a third-party device. According to the prompt information, the client device may know a network condition of the wireless network covering the location thereof, thereby selecting, according to the network condition, the most appropriate AP to access the corresponding wireless network.

A second communication module 620 is configured to acquire the AP information by using a low-energy wireless communication protocol.

In the apparatus of this embodiment, the AP information is received according to an agreement between the client device and one or more APs or the third-party device sending the prompt information and according to a particular low-energy wireless communication protocol; or the prompt information includes a requirement on a low-energy wireless communication protocol that should be used for receiving the AP information, the client device uses the low-energy wireless communication protocol to receive the AP information, and the low-energy wireless communication protocol may be any communication protocol whose power consumption for using a corresponding communication function is lower than power consumption for using a WiFi function, such as the classic Bluetooth protocol (Bluetooth 1.1, 1.2, 2.0, 2.1, and 3.0 versions), the Bluetooth Low Energy (BLE) protocol (Bluetooth 4.0 version), the Zigbee protocol, or the Near Field Communication (NFC) protocol, and correspondingly, the second communication module 620 may be a Bluetooth module, a Zigbee module, a BLE module or a NFC module. Therefore, the second communication module 620 receives the AP information according to a particular low-energy wireless communication protocol, thereby reducing power consumption of sending and receiving the AP information.

An access module 630 is configured to select, according to the AP information, an AP to access a wireless network.

To sum up, the apparatus of this embodiment can prompt a client device, by sending prompt information to the client device before the client device accesses an AP, that it can acquire AP information, so that a user can select the most appropriate AP according to the AP information; enabling receipt of the AP information after the prompt information is received can reduce power consumption costs of the client device to some extent, and use of the low-energy wireless communication protocol further reduces the power consumption of the client device.

In the method of this embodiment, AP information is sent and received according to a low-energy wireless communication protocol, while prompt information may be sent by using another protocol. Alternatively, the prompt information is included in a WiFi Beacon message, and is received by a client device together with the Beacon message. With reference to provisions for a frame format of a Beacon message in an 802.11 standard, the notification information may be included in a QoS Capability part or a Vendor Specific part of the Beacon message, or another suitable field.

In addition, in order to acquire the AP information, the second communication module 620 is further configured to advertise a QoS request message by using the low-energy wireless communication protocol.

In the apparatus of this embodiment, the prompt information is only used to prompt existence of AP information that can be received, and only indicates: an AP and/or a third-party device capable of providing the AP information exist/exists, and the AP and/or the third-party device may not provide the AP information currently. In order to acquire the AP information, the client device, after receiving the prompt information, issues a request to possible APs and/or third-party devices by determining a specific QoS requirement index of a user or an application (for example, the user hopes that an available effective bandwidth is greater than 2 Mbps, and the like) and advertising, by the second communication module 620, a QoS request message by using the low-energy wireless communication protocol. The QoS request message includes, but is not limited to, QoS requirements on the wireless network to be accessed, for example, it may further include conditions for responding to the QoS request message, that is, APs satisfying the conditions can respond to the QoS request message, to send corresponding AP information.

Figure 7:
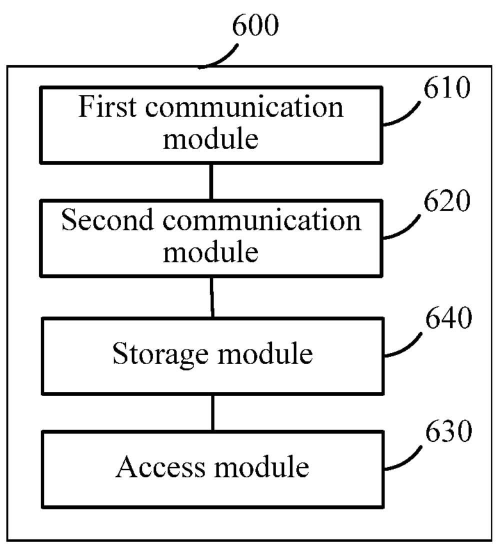
FIG. 7 is an example structural block diagram of a wireless network access apparatus of a client according to another embodiment of the present application.

There may be more than one AP responding to the QoS message and AP information from the same AP may be sent multiple times. Therefore, as shown in FIG. 7, the apparatus 600 of this embodiment further includes a storage module 640, configured to, after the AP information is received, update and store the AP information after extraction of key information (for example, a network type, an AP ID, a time stamp, and other possible information) included in the AP information, so as to select the most appropriate AP according to the stored information after a preset time (the process of receiving the AP information ends). It should be noted that, the storage module 640 may exist in a part of the client device or an apparatus independent of the client device, the storage module 640 may be an AP information database that stores AP information, the database may maintain an AP information list, and each time the client receives AP information, the client updates the AP information list according to key information extracted from the AP information, so as to provide a basis for screening of APs.

In addition, because there may be more than one AP responding to the QoS message, the access module 630 may select the AP to access the wireless network according to a preset rule after a preset time. For example, the preset rule may include: selecting an AP with the least number of accessed users; or may include selecting an AP with a maximum user available bandwidth, or the like. When the storage module 640 updates and stores the AP information, screening and sorting may be performed according to the preset rule, or screening and sorting are not performed.

Figure 8:
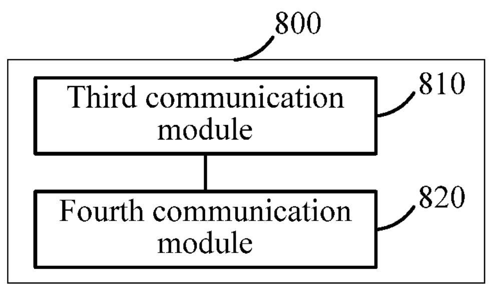
FIG. 8 is an example structural block diagram of a wireless network access apparatus of a server according to an embodiment of the present application.

Embodiments of the present application further provide another wireless network access apparatus; the apparatus is an access apparatus of a server, and may be a part of any one or more APs, or a third-party device. As shown in FIG. 8, the apparatus 800 includes the following modules.

A third communication module 810 is configured to send prompt information, where the prompt information is used to prompt existence of AP information that can be acquired.

As stated above, the prompt information is sent by wireless network access apparatuses of one or more APs, or is sent by a wireless network access apparatus as a third-party device, and used to notify a client about existence of AP information that can be acquired. The AP information may include one or more of the following content: a network type, an AP ID, the number of accessed users, total link bandwidth, user effective bandwidth (that is, available effective bandwidth after user access), link transmission delay, average forward delay, delay jitter, a time stamp and so on. According to the prompt information, the client device can know a network condition of the wireless network covering the location thereof, thereby selecting, according to the network condition, the most appropriate AP to access the corresponding wireless network.

Alternatively, the prompt information is included in a WiFi Beacon message, and is advertised together with the Beacon message and received by a client device. With reference to provisions for a frame format of a Beacon message in an 802.11 standard, the notification information may be included in a QoS Capability part or a Vendor Specific part of the Beacon message, or another suitable field.

A fourth communication module 820 is configured to send AP information of one or more APs by using a low-energy wireless communication protocol.

In order to reduce power consumption of sending and receiving the AP information, according to an agreement with the client device or provisions of the server, after acquisition of the AP information, the fourth communication module 820 sends the AP information by using a particular low-energy wireless communication protocol, thereby saving power consumption of sending the AP information; the low-energy wireless communication protocol is, for example, a BLE protocol, and correspondingly, the fourth communication module 820 is also a BLE module. Evidently, the server and the client use the same protocol to send and receive the AP information.

Figure 9:
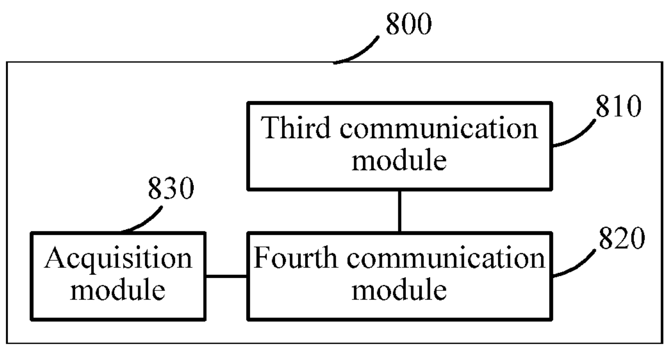
FIG. 9 is an example structural block diagram of a wireless network access apparatus of a server according to another embodiment of the present application.

In addition, the manner of acquiring the AP information may be distributed or centralized. For example, when the wireless network access apparatus is located on every AP, the APs may acquire network condition information of networks corresponding to the APs, and advertise the network condition information respectively; or when the wireless network access apparatus is located on a particular AP, the AP may acquire AP information of other APs and sends in a centralized manner; when the wireless network access apparatus is a third-party device, the third-party device acquires information of APs respectively and send the information in a centralized manner. Correspondingly, as shown in FIG. 9, the apparatus 800 of this embodiment may further include an acquisition module 830, used to acquire the AP information of one or more APs.

Figure 10:
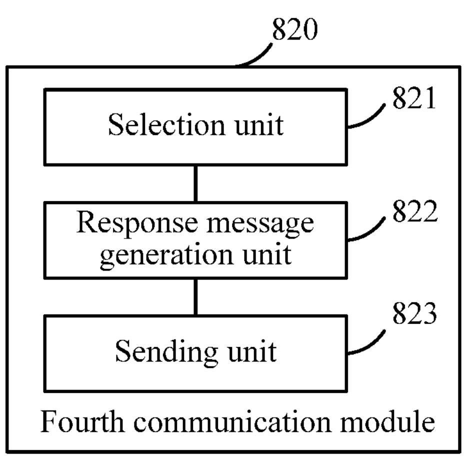
FIG. 10 is an example structural block diagram of a fourth communication module in a wireless network access apparatus of a server according to an embodiment of the present application.

In the apparatus of this embodiment, in addition to sending prompt information AP information, the server may receive a QoS request message with the fourth communication module 820 by using the low-energy wireless communication protocol. Moreover, as shown in FIG. 10, the fourth communication module 820 further includes the following units.

A selection unit 821 is configured to select one or more APs according to the QoS request message. The QoS request message includes QoS requirements of a user intending to access the wireless network, and the selection unit 821 selects one or more APs satisfying the requirements to wait for sending.

A response message generation unit 822 is configured to generate, according to the low-energy wireless communication protocol, a QoS response message including AP information of the one or more APs selected by the selection unit 821.

A format of generating the QoS response message according to the low-energy wireless communication protocol is, for example, as follows: a format of an advertising data packet of the AP information from an AP may be <a network type, an AP ID, one or more kinds of AP information, a time stamp>, but it is not limited thereto. It should be noted that, when the length of the AP information exceeds a maximum length limit of the QoS response message to be issued, the AP information may be divided into a plurality of data packets to send, but each data packet should include a network type, an AP ID and a time stamp to facilitate judgment on the range of the AP information.

In addition, all APs satisfying the QoS requirements can be selected, and in a case that the QoS request message includes conditions of responding to the QoS response message, APs satisfying the conditions should be selected.

A sending unit 823 is configured to send the QoS response message.

In embodiments of the present application, the low-energy wireless communication protocol is a BLE protocol, and BLE is the latest Bluetooth specification, that is, Bluetooth V4.0 technology, announced and formally launched by Bluetooth SIG in July 2010. The technology has extremely low operation and standby power consumption, which can even work continuously for several years by using a button battery. The technology also has a number of features such as a low cost, cross-vendor interoperability, completion of connection within 3 milliseconds, an extra-long distance of more than 100 meters, and AES-128 encryption, uses short-wave radio transmission at 2400-2483.5 MHz in a 2.4 GHz ISM band, and uses 2 MHz-bandwidth 40 RF channels. BLE transmission may have a variable range of, for example, 50 m to 100 m, an air data rate of about 1 Mb/s, and energy consumption of about 1% to 5% of typical Bluetooth.

BLE includes a plurality of link layer states, including an advertising state, an initiation state, a scanning state, a connection state and a ready state. A link layer in the advertising state may transmit advertising channel data, and may optionally monitor responses triggered by the advertising channel data and respond to the responses. In BLE, 40 RF channels are allocated to two kinds of physical channels: advertising channels and data channels. The advertising physical channels use three RF channels to discover devices, enable connections and advertise data. The data physical channels use at most 37 RF channels to communicate between connected devices. The link layer uses a physical channel at a given time. A BLE link layer only uses one data format for advertising channel data and data channel data. The data format is illustrated at 1100 in FIG. 11. Each piece of data consists of the following four fields: a preamble 1120, an access address 1140, a protocol data unit (PDU) 1160 and a cyclic redundancy check (CRC) 1180. When data is transmitted in the advertising physical channels, the PDU is called advertising channel PDU, and when data is transmitted in the data physical channels, the PDU is called data channel PDU. The advertising channel PDU 1160 has a 16-bit header 1200 and a variable-size payload 1300. A PDU type field 1210 of the advertising channel PDU included in the header 1200 indicates a PDU type. A length field 1250 indicates the length of the payload 1300 taking 8 Bits (Octets) as a unit. An effective range of the length field 1250 is six to thirty-seven 8 Bits. In a particular event, the following advertising channel PDU types are used:

ADV_IND: used for non-directional advertising events that can be connected;

ADV_DIRECT_IND: used for directional advertising events that can be connected;

ADV_NONCONN_IND: used for non-directional advertising events that cannot be connected; and ADV_SCAN_IND: used for non-directional advertising events that can be scanned;

where the PDU types are sent through link layers in the advertising state.

The PDU types ADV_IND, ADV_NONCONN_IND and ADV_SCAN_IND are used for "non-directional" advertising events, this means that transmission is advertised to nonspecific recipients and can be received by any suitably-configured device in a transmission range of a sending device. The ADV_IND type maybe used to establish a connection with one or more receiving devices, the ADV_NONCONN_IND type may be used to perform non-connected or one-way communication with one or more receiving devices, and the DV_SCAN_IND may be used to scan advertising events. Payloads 1300 of all the three PDU types ADV_IND, ADV_NONCONN_IND and ADV_SCAN_IND are the same. The payload 1300 is formed by an advertising address (AdvA) field 1320 and an advertising data (AdvData) field 1340. The AdvA field 1320 includes six 8 Bits of a public or random device address. The AdvData field 1340 may include zero to thirty-one 8 Bits of advertising data. 8-Bit 0 and 1 of the AdvData field 1340 may be retained for manufacturer data, 8-Bit 2 to 31 are left for advertising data, but when such manufacturer data is not needed, all 8-Bit 0 to 31 may be used for the advertising data.

In embodiments of the present application, two new BLE PUD types are used to advertise a QoS request message and a QoS response message, and definitions of them are shown in the following table respectively:

TABLE 1

| PDU Type Code ($b_3b_2b_1b_0$) | PDU Type |
|---|---|
| 0111 (or another retention value) | ADV_QOS_REQ |
| 1000 (or another retention value) | ADV_QOS_RSP |

Figure 11:
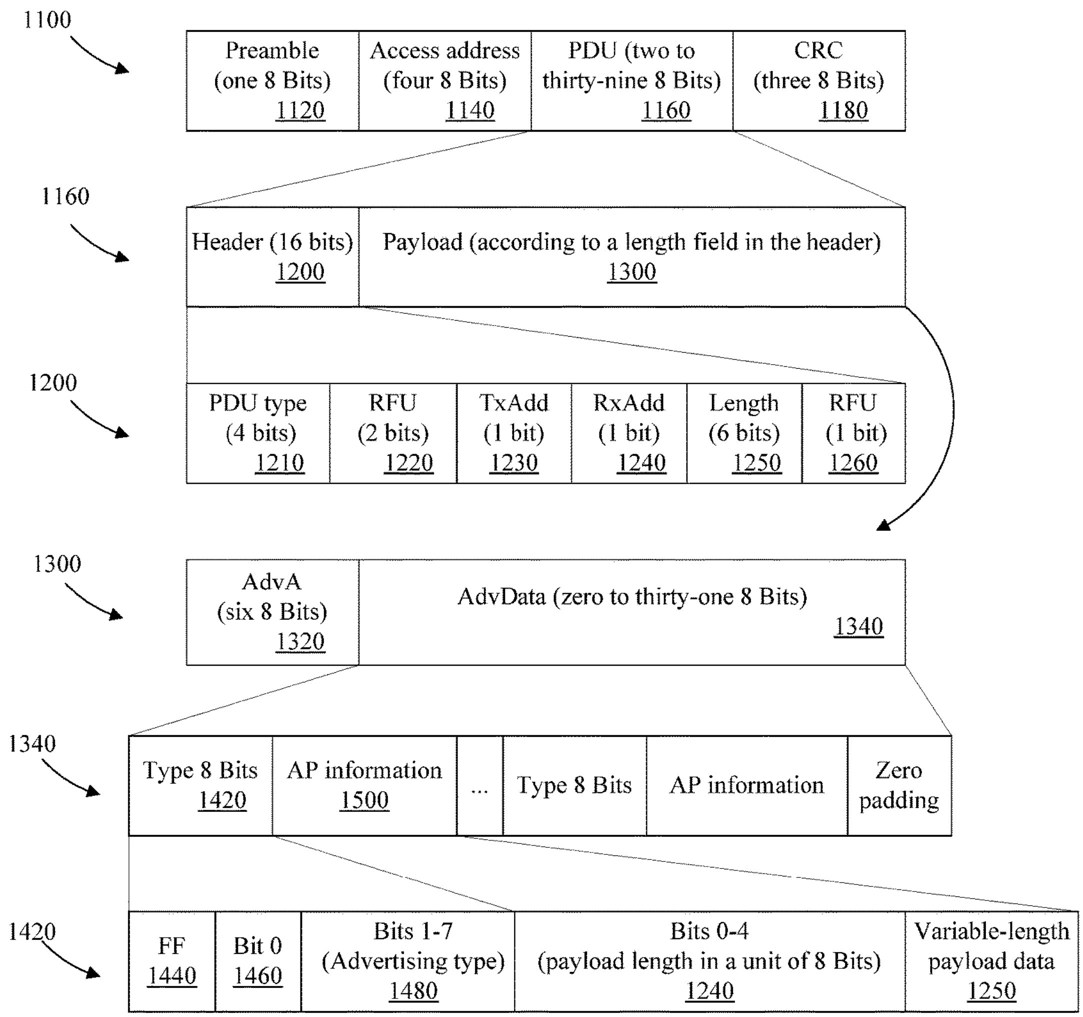
FIG. 11 illustrates an example BLE link layer message format and a message format of a QoS response message according to an embodiment of the present application.
Figure 12:
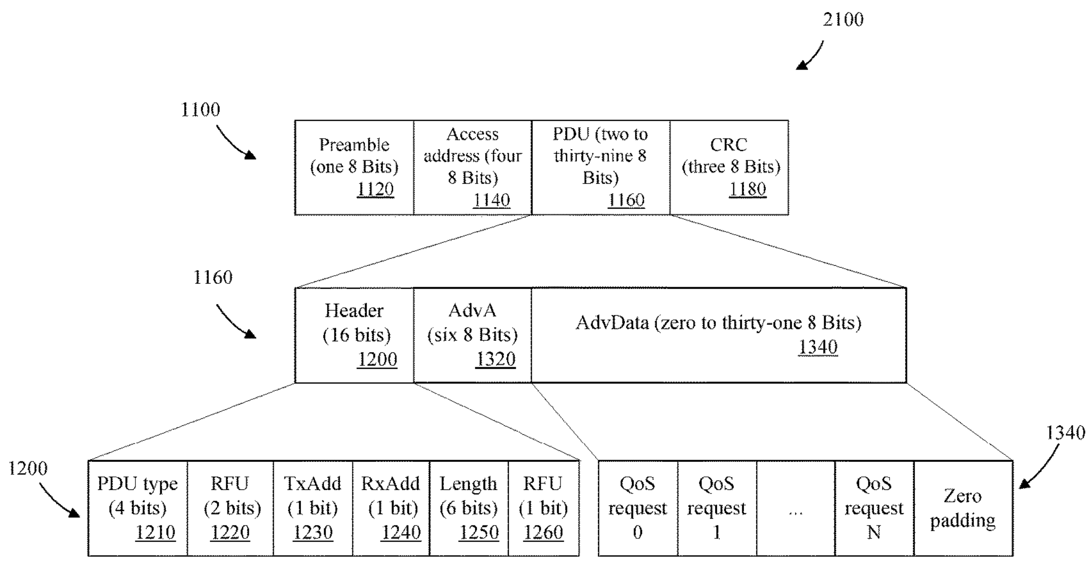
FIG. 12 illustrates an example message format of a QoS request message according to an embodiment of the present application.

Their payload formats are similar to the ADV_NONCONN_IND message 1000 shown in FIG. 11, including AdvA and advertising data AdvData, but differ in a specific format of the advertising data. Specifically, advertising data of ADV_QOS_RSP includes AP information (see FIG. 11), while advertising data of ADV_QOS_REQ includes several QoS requests (see FIG. 12), and an AD type used by the AP information is defined in Table 2. In addition, as shown in FIG. 12, the header 2100 of ADV_QOS_REQ defines two fields reserved by a BLE standard (RFU 1220 and RFU 1260 in FIG. 11) respectively as RCT (2 bits) and RCC (2 bits), so as to include the conditions of responding to the QoS request message, thereby controlling a recipient to send a response. For example, RCT: Response Control Type.

00: a response is made only when all QoS requirements are satisfied

01: a response is made only when at least QoS requirements numbered 1 to RCC are satisfied 10: a response is made only when at least any RCC QoS requirements are satisfied 11: Reserved for future use RCC: Response Control Counter, which functions when RCT is 01, 10 or 11, indicating the number of conditions satisfied.

TABLE 2

| Value | Name | Description |
|---|---|---|
| 0x20 | Network Type (NT) (1 Octets) | Indicate network types. 0x01: IEEE 802.11a/b/g/n; 0x02: Zigbee; 0x03: Bluetooth; 0x04: BLE; 0x05: IEEE 802.11ac; 0x06: IEEE 802.11ad; 0x07-0xFF: Reserved for future use |
| 0x21 | Access Device ID (ID) (n Octets) | Indicate a unique identity of an access object, such as, an SSID of a BSS. |
| 0x22 | Link Throughput (LT) (4 Octets) | Total link bandwidth, and floating point number, in a unit of Kbps |
| 0x23 | User Throughput (UT) (4 Octets) | Available effective bandwidth after user access, and floating point number, in a unit of Kbps |

TABLE 2-continued

| Value | Name | Description |
|---|---|---|
| 0x24 | Link Delay (LD) (4 Octets) | Link transmission delay, and floating point number, in a unit of ms |
| 0x25 | Queueing Delay (QD) (4 Octets) | AP queueing delay, and floating point number, in a unit of ms |
| 0x26 | Delay Jitter (DJ) (4 Octets) | Total delay jitter, and floating point number, in a range of 0-1 |
| 0x27 | Client Number (CN) (2 Octets) | The number of clients that have accessed the network, being an integer of 0 or greater than 0 |
| 0x28 | Time Stamp (TS) (4 Octets) | A time stamp, being an integer |

Upon receipt of the prompt information, the client apparatus generates an ADV_QOS_REQ message 2100 shown in FIG. 11 according to the QoS requirements, and sends out the message through an advertising channel (the message may be sent at a certain advertising interval, for example, 100 ms, and the duration is not less than 1 s), the BLE module is set to be in the scanning state, to wait for receiving a response message for the ADV_QOS_REQ, and the process is triggered by a user or through a timer timeout event. When the client apparatus receives an advertising packet, if the advertising packet is not ADV_QOS_RSP, a general advertising message handling procedure is invoked, and scanning continues; otherwise, key information (mainly including a network type, an AP ID and time stamp information) therein is extracted, and the AP information database is updated and stored according to the extracted information.

A server BLE module is in scanning state (scanning parameters are as follows, for example, a scanning window is 200 ms, and a scanning interval is 1 s). When an advertising packet is received, if the advertising packet is not ADV_QOS_REQ, a general advertising message handling procedure is invoked, and scanning continues; if it is ADV_QOS_REQ, values of various requirements of the ADV_QOS_REQ are extracted, and it is checked to see whether network conditions corresponding to one or more APs satisfy the requirements, if no, the process is ignored, and scanning continues; otherwise, the AP information is placed in an ADV_QOS_RSP advertising packet, and the ADV_QOS_RSP advertising packet is sent through a BLE advertising channel (which can be sent at a certain advertising interval, for example, 1 s). Because there may be multiple APs satisfying the QoS requirements of the client, in order to avoid that the multiple APs respond at the same time to cause collisions, a random waiting time may be set before sending of an ADV_QOS_RSP reply.

It should be noted that, when the length of the AP information exceeds a maximum length limit of the PDU, the server may divide the AP information into a plurality of data packets to send, but each data packet should include key information such as a network type, an AP ID and a time stamp, to facilitate judgment on the range of the AP information. In order to better define an advertising data packet of the AP information from an AP, the format of the advertising data packet of the AP information may be defined as <a network type, an AP ID, one or more kinds of AP information, a time stamp>, but it is not limited thereto. The format of each kind of AP information conforms to requirements of the Generic Access Profile (GAP), and a standard AD structure is used, including a length field, an AD type and an AD data field. With respect to different types of AP information, the corresponding AD types as shown in Table 2 are defined. Data advertising may last for a period of time, until an information advertising operation stops (triggered automatically or by a user). During advertising, once any part of the information is updated, corresponding information should be re-acquired and a new ADV_QOS_RSP message is constructed for advertising.

Figure 13:
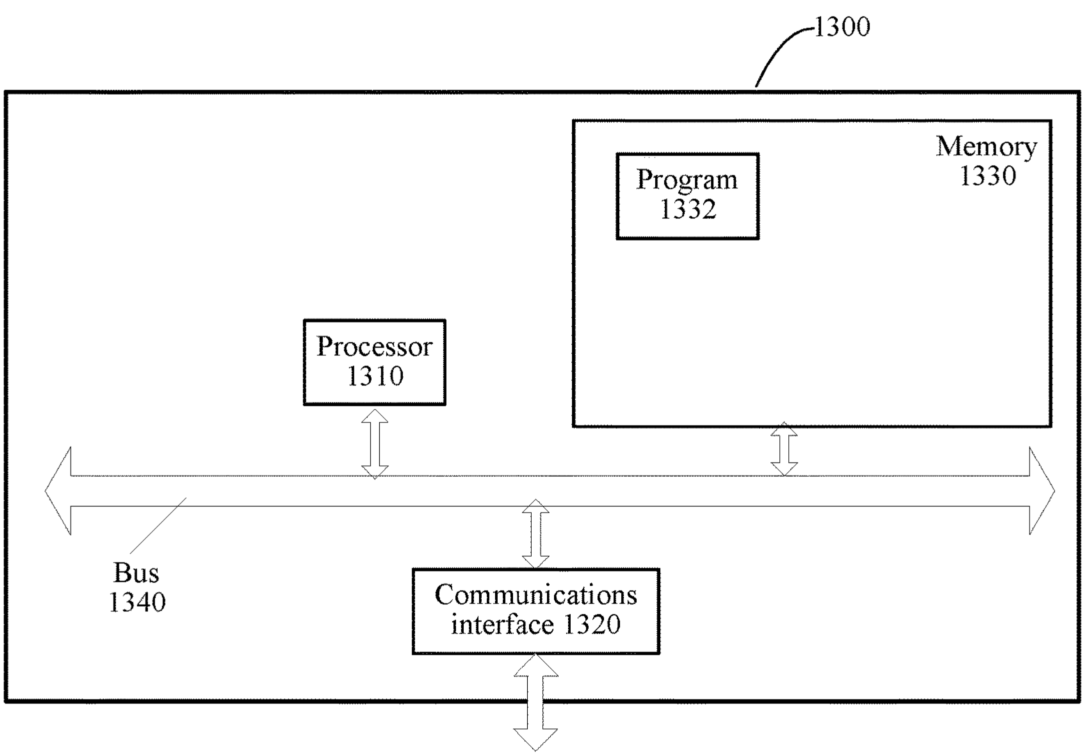
FIG. 13 is an example structural block diagram of a wireless network access apparatus of a client according to still another embodiment of the present application.

FIG. 13 illustrates another wireless network access apparatus 1300 of a client according to an embodiment of the present application. The specific embodiment of the present application does not limit specific implementation of the wireless network access apparatus 1300. As shown in FIG. 13, the apparatus 1300 may include:

a processor 1310, a communications interface 1320, a memory 1330, and a communications bus 1340.

The processor 1310, the communications interface 1320, and the memory 1330 complete mutual communications via the communications bus 1340.

The communications interface 1320 is configured to communicate with a network element such as a client.

The processor 1310 is configured to execute a program 1332, and specifically, can execute relevant steps in the process embodiment shown in FIG. 1 to FIG. 2.

Specifically, the program 1332 may include a program code, and the program code includes a computer operation instruction.

The processor 1310 may be a central processing unit (CPU), or an application specific integrated circuit (ASIC), or be configured to be one or more integrated circuits which implement embodiments of the present application.

The memory 1330 is configured to store the program 1332. The memory 1330 may include a high-speed RAM memory, and may also include a non-volatile memory, for example, at least one magnetic disk memory. The program 1332 may specifically include:

a first communication module, configured to receive prompt information, where the prompt information is used to prompt existence of AP information that can be acquired;

a second communication module, configured to acquire the AP information by using a low-energy wireless communication protocol; and an access module, configured to select, according to the AP information an AP to access a wireless network.

Reference may be made to the corresponding units in embodiments shown in FIG. 6 to FIG. 7 for specific implementation of each unit in the program 1332, which is not repeated herein. Those skilled in the art can clearly understand that, for convenience and clarity of description, reference may be made to the corresponding descriptions in the preceding process embodiments for the modules described above and the specific working procedures of the modules, and will not be repeated herein.

Figure 14:
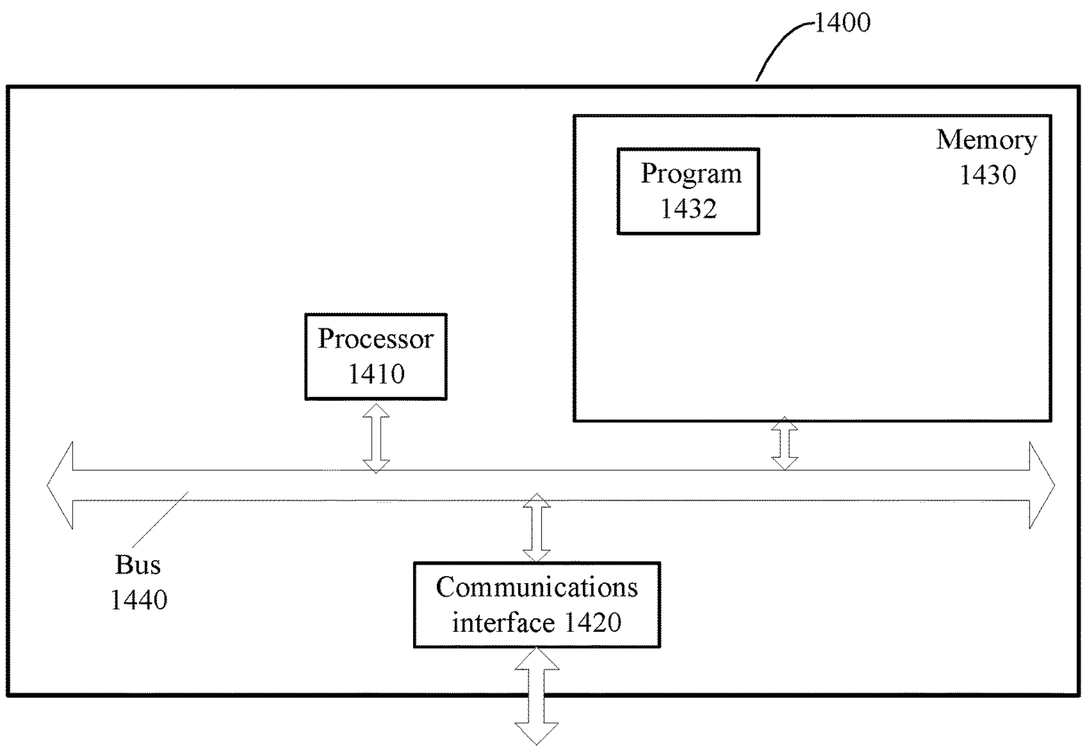
FIG. 14 is an example structural block diagram of a wireless network access apparatus of a server according to still another embodiment of the present application.

FIG. 14 illustrates another wireless network access apparatus 1400 of a server according to an embodiment of the present application. The specific embodiment of the present application does not limit specific implementation of the wireless network access apparatus 1400. As shown in FIG. 14, the apparatus 1400 may include:

a processor 1410, a communications interface 1420, a memory 1430, and a communications bus 1440.

The processor 1410, the communications interface 1420, and the memory 1430 complete mutual communications via the communications bus 1440.

The communications interface 1420 is configured to communicate with a network element such as a client.

The processor 1410 is configured to execute a program 1432, and specifically, can execute relevant steps in the method embodiment shown in FIG. 3 to FIG. 5.

Specifically, the program 1432 may include a program code, and the program code includes a computer operation instruction.

The processor 1410 may be a central processing unit (CPU), or an application specific integrated circuit (ASIC), or be configured to be one or more integrated circuits which implement embodiments of the present application.

The memory 1430 is configured to store the program 1432. The memory 1430 may include a high-speed RAM memory, and may also include a non-volatile memory, for example, at least one magnetic disk memory. The program 1432 may specifically make the apparatus 1400 execute the following steps:

receiving prompt information, where the prompt information is used to prompt existence of AP information that can be acquired;

acquiring the AP information by using a low-energy wireless communication protocol; and selecting, according to the AP information, an AP accessing a wireless network.

It can be appreciated by those of ordinary skill in the art that each exemplary unit and method step described with reference to embodiments disclosed herein can be implemented by electronic hardware or a combination of computer software and electronic hardware. Whether these functions are executed in a hardware mode or a software mode depends on the particular applications and design constraint conditions of the technical solution. Those skilled in the art can use different methods to implement the functions described with respect to each particular application, but such implementation should not be considered to go beyond the scope of the present application.

If the function is implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and includes several instructions for enabling a computer apparatus (which may be a personal computer, a server, a network device, or the like) to execute all or some steps of the method described in each embodiment of the present application. The preceding storage medium includes various media which can store a program code, such as a USB disk, a mobile hard disk, a read-only memory (ROM), a random access memory (RAM), a magnetic disk or an optical disc.

The above implementations are only used to describe the present application, instead of limiting the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method, comprising:

receiving, by a device comprising a processor, prompt information sent by at least one of one or more access points (APs) or a third-party device, wherein the prompt information is only used to prompt existence of AP information that is capable of being acquired;

advertising a quality of service (QoS) request message using a low-energy wireless communication protocol;

acquiring the AP information in response to the QoS request message using the low-energy wireless communication protocol; and selecting, according to the AP information, an AP to access a wireless network, wherein the AP information is received according to an agreement between the device and the at least one of the one or more APs or the third-party device, the agreement relating to communicating the prompt information and according to a specified low-energy wireless communication protocol.

2. The method of claim 1, wherein the prompt information is comprised in a WiFi Beacon message.

3. The method of claim 1, wherein the QoS request message comprises a QoS requirement on the wireless network to be accessed.

4. The method of claim 1, wherein the QoS request message comprises a condition for responding to the QoS request message.

5. The method of claim 1, further comprising:

updating the AP information resulting in updated AP information and storing the updated AP information.

6. The method of claim 1, wherein the selecting the AP comprises:

selecting the AP to access the wireless network after a preset time.

7. The method of claim 1, wherein the selecting the AP comprises:

selecting, according to a preset rule, the AP to access the wireless network.

8. The method of claim 7, wherein the preset rule comprises:

selecting the AP with a least number of user devices currently accessing the AP.

9. The method of claim 7, wherein the preset rule comprises:

selecting the AP with a maximum available bandwidth for user devices.

10. The method of claim 1, wherein the low-energy wireless communication protocol is a Bluetooth Low Energy (BLE) protocol.

11. The method of claim 1, wherein the AP information comprises at least one of a network type, an AP ID, a number of user devices currently accessing the AP, a total link bandwidth of the AP, an effective bandwidth for user devices to access the AP, an average link delay of the AP, an average forward delay of the AP, a delay jitter associated with the AP, or a time stamp.

12. The method of claim 1, wherein the low-energy wireless communication protocol is a wireless communication protocol that consumes less power for communication function than power consumption of a corresponding WiFi function.

13. The method of claim 12, wherein the low-energy wireless communication protocol is a Bluetooth protocol.

14. The method of claim 12, wherein the low-energy wireless communication protocol is a Zigbee protocol.

15. The method of claim 12, wherein the low-energy wireless communication protocol is a near field communication protocol.

16. A method, comprising:

sending, by at least one of one or more access points (APs) or a third-party device comprising a processor, prompt information, wherein the prompt information is exclusively used to prompt existence of AP information of the at least one of the one or more APs or the third-party device that is accessible;

receiving a QoS request message by using a low-energy wireless communication protocol; and in response to the QoS request message, sending the AP information using the low-energy wireless communication protocol, wherein the AP information is received according to an agreement between the device and the at least one of the one or more APs or the third-party device, wherein the agreement relates to sending the prompt information and according to a specified low-energy wireless communication protocol.

17. The method of claim 16, further comprising:

acquiring the AP information of the one or more APs.

18. The method of claim 16, wherein the AP information is comprised in a WiFi Beacon message.

19. The method of claim 16, wherein sending the AP information further comprises:

selecting the one or more APs according to the QoS request message;

generating, according to the low-energy wireless communication protocol, a QoS response message comprising the AP information of the one or more APs or the third-party device; and sending the QoS response message.

20. The method of claim 19, wherein the QoS request message comprises a QoS requirement of a user device requesting access the wireless network.

21. The method of claim 19, wherein the QoS request message comprises a condition for responding to the QoS request message.

22. The method of claim 16, wherein the low-energy wireless communication protocol is a Bluetooth Low Energy (BLE) protocol.

23. The method of claim 16, wherein the AP information comprises at least one of a network type, an AP ID, a number of accessing users, a total link bandwidth, a user effective bandwidth, an average link delay, an average forward delay, a delay jitter, and a time stamp.

24. An apparatus, comprising:

a memory that stores executable modules; and a processor, coupled to the memory, that executes the executable modules to perform operations of the apparatus, the executable modules comprising:

a first communication module configured to receive prompt information sent by at least one of one or more access points (APs) or a third-party device, wherein the prompt information is used to prompt existence of AP information that is capable of being acquired;

a second communication module configured to acquire the AP information by using a low-energy wireless communication protocol, and further configured to advertise a QoS request message by using the low-energy wireless communication protocol; and an access module configured to select, according to the AP information, an AP to access a wireless network, wherein the AP information is received according to an agreement between the device and the at least one of the one or more APs or the third-party device, the agreement relating to communicating the prompt information and according to a specified low-energy wireless communication protocol.

25. The apparatus of claim 24, the executable modules further comprising:

a storage module configured to update and store the AP information.

26. The apparatus of claim 24, wherein the access module is further configured to select the AP to access the wireless network after a preset time.

27. The apparatus of claim 24, wherein the access module is further configured to select, according to a preset rule, the AP to access the wireless network.

28. The apparatus of claim 27, wherein the access module is further configured to select the AP with a least number of users accessing the AP.

29. The apparatus of claim 27, wherein the access module is further configured to select an AP with a maximum available bandwidth for users.

30. The apparatus of claim 24, wherein the second communication module is further configured to receive the AP information by using a Bluetooth Low Energy (BLE) protocol.

31. An apparatus, comprising:

a memory that stores executable modules; and a processor, coupled to the memory, that executes the executable modules to perform operations of the apparatus, the executable modules comprising:

a first communication module configured to send prompt information from at least one of one or more access points (APs) or a third-party device, wherein the prompt information is solely used to prompt existence of AP information, of the at least one of the one or more APs or the third-party device, that is accessible; and a second communication module configured to send the AP information by using a low-energy wireless communication protocol, and further configured to receive a QoS request message by using the low-energy wireless communication protocol, wherein the AP information is received according to an agreement between the device and the at least one of the one or more APs or the third-party device, the agreement relating to communicating the prompt information and according to a specified low-energy wireless communication protocol.

32. The apparatus of claim 31, the executable modules further comprising:

an acquisition module configured to acquire the AP information.

33. The apparatus of claim 31, wherein the first communication module sends the AP information by including the AP information in a WiFi Beacon message.

34. The apparatus of claim 31, wherein the second communication module further comprises:

a selection unit configured to select the AP according to the QoS request message;

a response message generation unit configured to generate, according to the low-energy wireless communication protocol, a QoS response message comprising the AP information; and a sending unit configured to send the QoS response message.

35. The apparatus of claim 31, wherein the low-energy wireless communication protocol is a Bluetooth Low Energy (BLE) protocol.

36. A non-transitory computer-readable medium having instructions stored thereon that, in response to execution, cause a system comprising a processor to perform operations, comprising:

receiving prompt information sent by at least one of one or more access points (APs) or a third-party device, wherein the prompt information is only used to prompt existence of AP information that is exposed for acquisition;

advertising a QoS request message using a low-energy wireless communication protocol;

in response to the QoS request message, acquiring the AP information by using the low-energy wireless communication protocol; and selecting, according to the AP information, an AP to access a wireless network, wherein the AP information is received according to an agreement between the device and the at least one of the one or more APs or the third-party device, the agreement relating to communicating the prompt information and according to a specified low-energy wireless communication protocol.

37. A device for accessing wireless network, comprising:

a processor and a memory, wherein the memory stores executable instructions, the processor is connected with the memory via a communication bus, and when the device is operating, the processor executes or facilitates execution of the executable instructions stored by the memory to cause the device to perform operations, comprising:

receiving prompt information sent by at least one of one or more access points (APs) or a third-party device, wherein the prompt information is only used to prompt existence of AP information that can be acquired;

advertising a QoS request message using a low-energy wireless communication protocol;

in response to the QoS request message, acquiring the AP information by using the low-energy wireless communication protocol; and selecting, according to the AP information, an AP to access a wireless network, wherein the AP information is received according to an agreement between the device and the at least one of the one or more APs or the third-party device, the agreement relating to communicating the prompt information and according to a specified low-energy wireless communication protocol.

38. A non-transitory computer-readable medium having instructions stored thereon that, in response to execution, cause a system comprising a processor to perform operations, comprising:

sending prompt information from at least one of one or more access points (APs) or a third-party device, wherein the prompt information is exclusively used to prompt existence of AP information of the at least one of the one or more APs or the third-party device that is authorized to be requested;

receiving a QoS request message by using a low-energy wireless communication protocol; and sending the AP information in response to the QoS request message by using the low-energy wireless communication protocol, wherein the AP information is received according to an agreement between the device and the at least one of the one or more APs or the third-party device, the agreement relating to communicating the prompt information and according to a specified low-energy wireless communication protocol.

39. A device for accessing wireless network, comprising:

a processor and a memory, wherein the memory stores executable instructions, the processor is connected with the memory via a communication bus, and in response to execution of the executable instructions, the device performs operations, comprising:

sending prompt information from at least one of one or more access points (APs) or a third-party device, wherein the prompt information is used exclusively to prompt existence of AP information, of the at least one of the one or more APs or the third-party device, that is in accessible memory of the memory;

receiving a QoS request message by using a low-energy wireless communication protocol; and in response to the QoS request message, sending the AP information by using the low-energy wireless communication protocol, wherein the AP information is received according to an agreement between the device and the at least one of the one or more APs or the third-party device, the agreement relating to communicating the prompt information and according to a specified low-energy wireless communication protocol.

* * * * *